US012697968B2

(12) United States Patent
Ito et al.

(10) Patent No.: US 12,697,968 B2
(45) Date of Patent: Aug. 4, 2026

(54) TRAVELING CONTROL APPARATUS FOR CONTROLLING VEHICLE TRAVEL BASED ON TARGET PATH GENERATED FROM RECOGNITION RESULTS OF DIVISION LINES

(71) Applicant: Honda Motor Co., Ltd., Tokyo (JP)

(72) Inventors: Shingo Ito, Wako (JP); Tadahiko Kanoh, Wako (JP); Yuki Kizumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 18/101,207

(22) Filed: Jan. 25, 2023

(65) Prior Publication Data

US 2023/0242108 A1     Aug. 3, 2023

(30) Foreign Application Priority Data

Jan. 31, 2022     (JP) ................................. 2022-013349

(51) Int. Cl.
*B60W 30/12*          (2020.01)
*G06V 20/56*          (2022.01)
(52) U.S. Cl.
CPC ........... *B60W 30/12* (2013.01); *G06V 20/588* (2022.01); *B60W 2420/403* (2013.01); *B60W 2552/53* (2020.02)
(58) Field of Classification Search
CPC ........... B60W 30/12; B60W 2420/403; B60W 2552/53; B60W 50/14; B60W 60/0053; B60W 40/02; G06V 20/588; G06V 20/58
(Continued)

(56) References Cited

U.S. PATENT DOCUMENTS

2015/0165973 A1     6/2015   Takemae
2015/0274206 A1*   10/2015   Takeda ................... B62D 6/008
                                                                701/41

(Continued)

FOREIGN PATENT DOCUMENTS

CN          104335264  A      2/2015
JP            4654208  B2     3/2011

OTHER PUBLICATIONS

Chinese Office action; Application 202310113593.1; 16 pages; Mar. 31, 2026.

*Primary Examiner* — Abby J Flynn
*Assistant Examiner* — Sean Patrick Reidy
(74) *Attorney, Agent, or Firm* — Duft & Bornsen, PC

(57)                    ABSTRACT

A vehicle control apparatus includes a microprocessor and a first and second exterior environment detection units configured to detect an exterior environment situation in a predetermined region around the subject vehicle respectively. The microprocessor is configured to perform: recognizing a pair of left and right first division lines defining a current lane on which the subject vehicle is traveling based on a detection value of the first exterior environment detection unit and a pair of left and right second division lines defining the current lane based on a detection value of the second exterior environment detection unit; electing each of left and right division lines having short distances from the subject vehicle from the pair of left and right first division line and the pair of left and right second division line recognized in the recognizing; and generating the target path based on the left and right division lines selected in the selecting.

2 Claims, 3 Drawing Sheets

(58) Field of Classification Search
USPC ........................................................ 701/23
See application file for complete search history.

(56) References Cited

U.S. PATENT DOCUMENTS

| | | | |
|---|---|---|---|
| 2016/0257342 A1* | 9/2016 | Ueda .................... | B62D 15/026 |
| 2019/0061808 A1* | 2/2019 | Mizoguchi ............. | G01C 21/26 |
| 2020/0234573 A1* | 7/2020 | Fujii .................... | G05D 1/0027 |
| 2021/0182575 A1* | 6/2021 | Murakami .......... | B60W 60/001 |
| 2023/0109155 A1* | 4/2023 | Takehara ............. | B62D 15/025 |
| | | | 701/26 |

* cited by examiner

TRAVELING CONTROL APPARATUS FOR CONTROLLING VEHICLE TRAVEL BASED ON TARGET PATH GENERATED FROM RECOGNITION RESULTS OF DIVISION LINES

CROSS-REFERENCE TO RELATED APPLICATION

This application is based upon and claims the benefit of priority from Japanese Patent Application No. 2022-013349 filed on Jan. 31, 2022, the content of which are incorporated herein by reference.

BACKGROUND OF THE INVENTION

Field of the Invention

This invention relates to a vehicle traveling apparatus for controlling a traveling of a vehicle.

Description of the Related Art

Hitherto, as this type of apparatus, there has been known an apparatus that recognizes division lines defining a current lane based on a captured image of the surrounding of a vehicle and provides driving assistance based on the division line recognition result (see, for example, JP 4654208 B2). The apparatus described in JP 4654208 B2 compares division lines recognized based on a captured image of a space in front of a vehicle with division lines recognized based on a captured image of a space behind the vehicle, and detects erroneous recognition of the division lines based on a deviation amount between the division lines.

However, at a point where the shape of a road changes, such as a curved road, the position of the division line may be different between a space in the front of the vehicle and a space behind the vehicle. Therefore, it is not possible to accurately detect erroneous recognition of the division lines by comparing the division lines recognized in front of the vehicle with the division lines recognized behind the vehicle as in the apparatus described in JP 4654208 B2, and it is thus difficult to satisfactorily perform travel control of the vehicle.

SUMMARY OF THE INVENTION

An aspect of the present invention is a vehicle control apparatus configured to control an actuator for traveling so that a subject vehicle travels along a target path including: a microprocessor, a memory coupled to the microprocessor, and a first and second exterior environment detection units configured to detect an exterior environment situation in a predetermined region around the subject vehicle respectively. The microprocessor is configured to perform: recognizing a pair of left and right first division lines defining a current lane on which the subject vehicle is traveling based on a detection value of the first exterior environment detection unit and a pair of left and right second division lines defining the current lane based on a detection value of the second exterior environment detection unit; selecting each of left and right division lines having short distances from the subject vehicle from the pair of left and right first division line and the pair of left and right second division line recognized in the recognizing; and generating the target path based on the left and right division lines selected in the selecting.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 5. A vehicle control apparatus according to the embodiment of the present invention can be applied to a vehicle having a self-driving capability, that is, a self-driving vehicle. Note that the vehicle control apparatus according to the embodiment of the present invention is applicable to both a manual driving vehicle and the self-driving vehicle having a driving assistance function, but for convenience of description, a case where the vehicle control apparatus is applied to the self-driving vehicle will be described below as an example. Further, a vehicle to which the vehicle control apparatus according to the present embodiment is applied may be referred to as a subject vehicle to be distinguished from other vehicles. The subject vehicle may be any of an engine vehicle having an internal combustion engine as a traveling drive source, an electric vehicle having a traveling motor as a traveling drive source, and a hybrid vehicle having an engine and a traveling motor as traveling drive sources. The subject vehicle can travel not only in a self-drive mode in which driving operation by a driver is unnecessary, but also in a manual drive mode with driving operation by the driver.

Examples of one self-driving capability of the self-driving vehicle include a function of controlling a traveling actuator in such a way as to travel near the center of the current lane (which will hereinafter be referred to as a lane keeping function). In a case where the lane keeping function is activated, the self-driving vehicle recognizes division lines that define the current lane based on image data (which will hereinafter be referred to as captured image data or simply referred to as a captured image) obtained by an imaging unit installed at a predetermined portion (for example, an upper portion of a windshield) of the vehicle, and controls the traveling actuator in such a way that the subject vehicle travels near the center of the current lane based on information of the recognized division lines.

Figure 1:
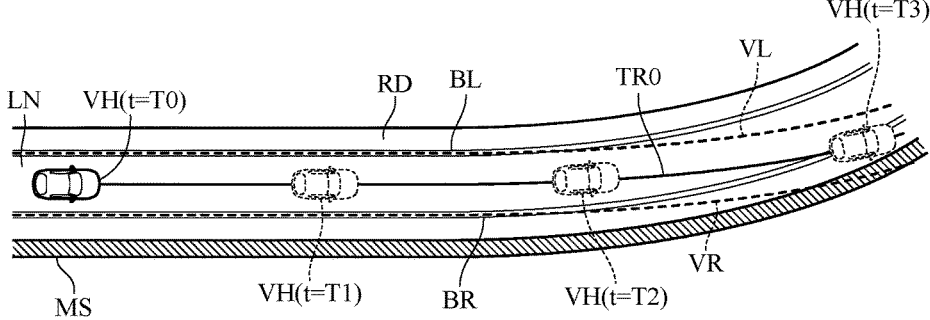
FIG. 1 is a diagram for explaining erroneous recognition of division lines.

Meanwhile, a camera lens of the imaging unit may be contaminated, or halation may occur in the captured image of the imaging unit due to sunlight or the like. In such a case, accuracy in recognition of the division lines based on the captured image is deteriorated. FIG. 1 is a diagram for explaining erroneous recognition of the division lines. FIG. 1 illustrates a state in which a vehicle VH travels in a lane LN of a road RD having one lane on one side of left-hand traffic. The vehicle VH is a self-driving vehicle, and is self-driving in the self-drive mode. Lines BL and BR in the drawing represent division lines that are provided on the road RD and define the lane LN. Broken lines VL and VR represent a result (which will hereinafter be referred to as virtual division lines) of recognizing the division lines BL and BR based on the captured image obtained by the imaging unit installed at a front portion of the vehicle VH. On the road RD, a median strip (concrete wall) MS is installed between the lane LN and an opposite lane (not illustrated).

When the lane keeping function of the vehicle VH is activated, the vehicle VH generates a driving path (target path) TR0 passing through the center between the virtual division lines VL and VR, and travels along the target path TR0. As a result, the vehicle VH can travel near the center of the lane LN without driving operation by the driver. The target path is a driving path from a current time point to a predetermined time ahead. FIG. 1 illustrates the target path of the vehicle VH from the current time point (time point T0) to a time point T3.

As illustrated in FIG. 1, in a case where the positions of the virtual division lines VL and VR deviate from the positions of the actual division lines BL and BR, the target path TR0 deviates from the center of the lane LN. The vehicle VH may depart from the road depending on position deviation amounts (which will hereinafter be simply referred to as deviation amounts) of the virtual division lines VL and VR from the division lines BL and BR. In the example illustrated in FIG. 1, the traveling position of the vehicle VH starts to deviate to the right (the lower side in the drawing) from the center between the division lines BL and BR near a time point T1, and the vehicle VH departs from the current lane LN at the time point T3. In the present embodiment, the vehicle control apparatus is configured as follows in such a way as to mitigate such road departure due to erroneous recognition of the division lines.

Figure 2:
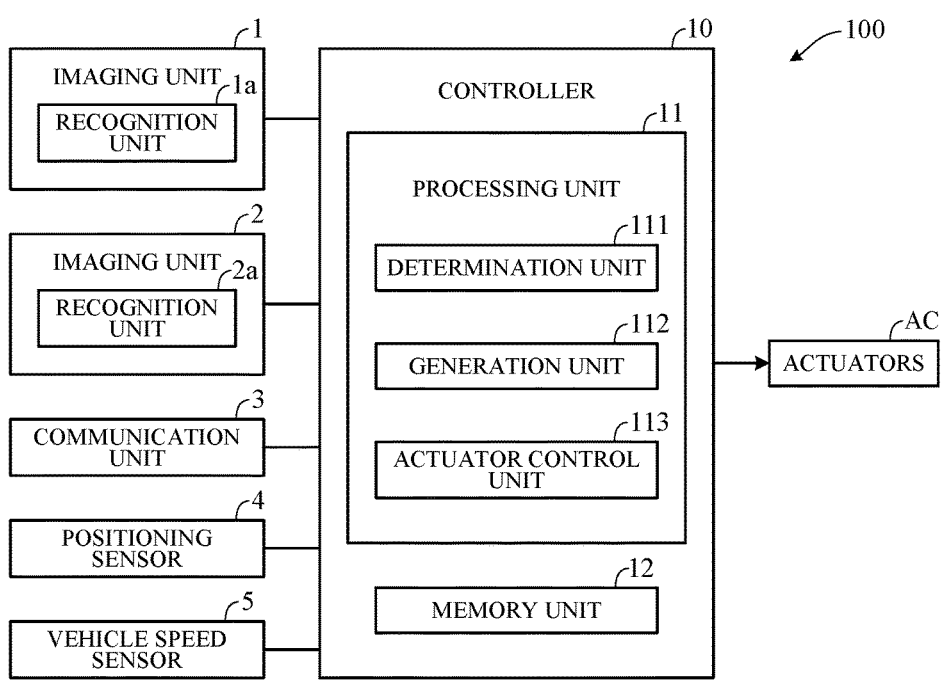
FIG. 2 is a block diagram schematically illustrating a main part configuration of a vehicle control apparatus according to an embodiment of the present invention.

FIG. 2 is a block diagram schematically illustrating a main part configuration of a vehicle control apparatus 100 according to the embodiment of the present invention. As illustrated in FIG. 2, the vehicle control apparatus 100 includes a controller 10, and an imaging unit 1, an imaging unit 2, a communication unit 3, and an actuators AC, which are each communicatively connected to the controller 10.

Figure 3:
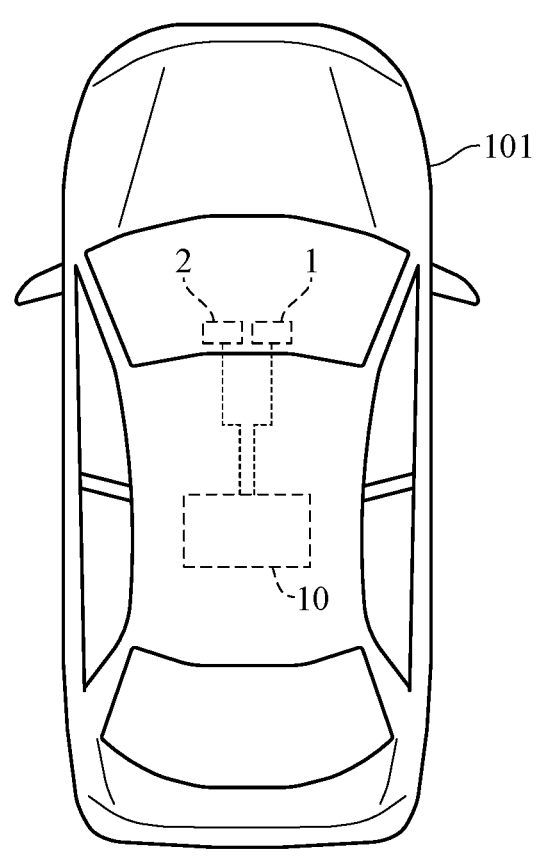
FIG. 3 is a diagram illustrating an example of a vehicle to which the vehicle control apparatus is applied.

The imaging units 1 and 2 each include an imaging device (image sensor) such as a CCD or a CMOS. The imaging units 1 and 2 captures images of a predetermined region around the subject vehicle. FIG. 3 is a diagram illustrating an example of a subject vehicle 101 to which the vehicle control apparatus 100 is applied. The imaging units 1 and 2 are mounted at an upper portion of a windshield of the subject vehicle 101 as illustrated in FIG. 3 and each continuously capture images of a space in front of the subject vehicle 101 to acquire image data (which will hereinafter be referred to as captured image data or simply referred to as a captured image). The imaging units 1 and 2 are installed in such a way that image capturing ranges thereof are substantially the same. Note that the imaging units 1 and 2 may be different from each other in regard to manufacturer, type, performance, and the like, and each may be implemented by a single housing. The imaging units 1 and 2 may each be a monocular camera or a stereo camera.

More specifically, the imaging units 1 and 2 each include a computer including a processing unit (not illustrated) such as a CPU (microprocessor), a memory unit (not illustrated) such as a ROM and a RAM, and other peripheral circuits (not illustrated) such as an I/O interface. The processing units of the imaging units 1 and 2 include recognition units 1a and 2a as functional configurations.

The recognition units 1a and 2a recognize an exterior environment situation in the predetermined region around the subject vehicle 101 based on the captured image data acquired by the imaging devices of the imaging units 1 and 2. Specifically, the recognition units 1a and 2a recognize the division lines included in the imaging ranges based on the captured image data obtained by the imaging units 1 and 2. The recognition units 1a and 2a output, to the controller 10, at least information indicating a result of recognizing a pair of left and right division lines defining the current lane (hereinafter, referred to as division line information). The recognition units 1a and 2a recognize the division lines by using different algorithms. Therefore, the recognition units 1a and 2a may output the division line information indicating the division lines having different positions and shapes based on the same captured image data. Note that the recognition units 1a and 2a may output the captured image data obtained by the imaging units 1 and 2 to the controller 10 together with the division line information.

The communication unit 3 communicates with various apparatuses (not illustrated) via a network including a wireless communication network represented by the Internet network or a mobile phone network. The network includes not only a public wireless communication network but also a closed communication network provided for each predetermined management region, for example, a wireless LAN, Wi-Fi (registered trademark), Bluetooth (registered trademark), and the like.

A positioning sensor 4 receives a positioning signal transmitted from a positioning satellite. The positioning satellite is an artificial satellite such as a global positioning system (GPS) satellite or a quasi-zenith satellite. Positioning information received by the positioning sensor 4 is used to measure the current position (latitude, longitude, and altitude) of the subject vehicle 101. The positioning sensor 4 is used to detect the position of the subject vehicle 101. Therefore, a distance detection unit (for example, a radar or LiDAR) that detects a distance from the subject vehicle 101 to an object (an object on the road) may be used instead of the positioning sensor 4. In this case, the position of the subject vehicle 101 is detected based on position information of the object on the road obtained from map information stored in a memory unit 12 and information on the distance to the object obtained by the positioning sensor 4. The positioning sensor 4 may be a combination of a receiver for positioning signals and the distance detection unit. A vehicle speed sensor 5 detects the vehicle speed of the subject vehicle 101. The actuators AC includes a throttle actuator and a traveling actuator such as a shift actuator, a brake actuator, and a steering actuator.

The controller 10 includes an electronic control unit (ECU). More specifically, the controller 10 includes a computer including a processing unit 11 such as a CPU (microprocessor), the memory unit 12 such as a ROM or a RAM, and other peripheral circuits (not illustrated) such as an I/O interface. Although a plurality of ECUs having different functions such as an engine control ECU, a traveling motor control ECU, and a braking device ECU may be separately provided, in FIG. 2, the controller 10 is illustrated as a set of these ECUs for convenience.

The memory unit 12 stores information such as various control programs and thresholds used in the programs. The processing unit 11 includes, as its functional configuration, a determination unit 111, a generation unit 112, and an actuator control unit 113.

Based on the division line information output from the recognition units 1a and 2a, the determination unit 111 compares the positions of the pair of left and right virtual division lines, which is the recognition result of the recognition unit 1*a*, with the positions of the pair of left and right virtual division lines, which is the recognition result of the recognition unit 2*a*, and determines whether or not there is a possibility that the road departure of the subject vehicle 101 occurs. Specifically, the determination unit 111 calculates a deviation amount between the virtual division lines corresponding to the division line BR in a vehicle width direction and a deviation amount between the virtual division lines corresponding to the division line BL in the vehicle width direction. In a case where any deviation amount is equal to or larger than a predetermined threshold, the determination unit 111 determines that there is a possibility that the road departure of the subject vehicle 101 occurs.

In a case where it is determined that there is a possibility that the road departure of the subject vehicle 101 occurs, the determination unit 111 requests an occupant to perform driving operation such as steering wheel operation (hereinafter, the request is referred to as a hands-on request). Specifically, the determination unit 111 outputs a command (voice information or image information) for requesting the occupant to perform driving operation via a speaker (not illustrated) or a display (not illustrated) installed in a vehicle compartment of the subject vehicle.

In a case where the determination unit 111 determines that there is no possibility that the road departure of the subject vehicle 101 occurs, the generation unit 112 generates the target path of the subject vehicle 101. Specifically, the generation unit 112 selects, based on the division line information output from the recognition units 1*a* and 2*a*, each of left and right division lines having short distances from the subject vehicle 101 from a pair of left and right division lines that define the current lane and are recognized by the recognition unit 1*a* and a pair of left and right division lines that define the current lane and are recognized by the recognition unit 2*a*. More specifically, the generation unit 112 selects each of left and right virtual division lines having short distances from the subject vehicle 101 from a result (a pair of left and right virtual division lines) of recognizing the pair of left and right division lines that define the current lane by the recognition unit 1*a* and a result (a pair of left and right virtual division lines) of recognizing the pair of left and right division lines that define the current lane by the recognition unit 2*a*. The generation unit 112 generates the target path in such a way as to pass through the center between the selected left and right virtual division lines.

Figure 4:
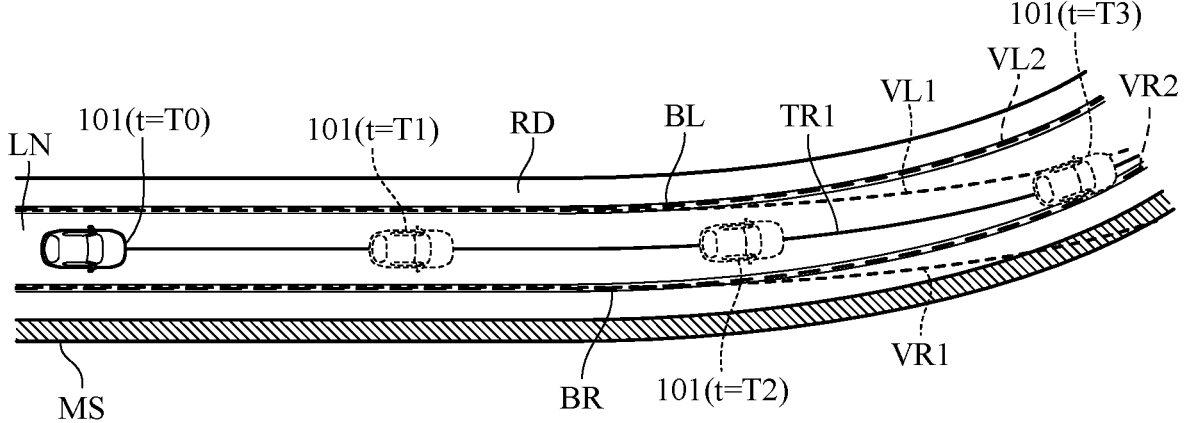
FIG. 4 is a diagram for explaining generation of a target path by the generation unit in FIG. 2.

FIG. 4 is a diagram for explaining generation of the target path by the generation unit 112. FIG. 4 illustrates a target path TR1 of the subject vehicle 101 traveling in the lane LN of the road RD of FIG. 1 from the current time point (time point T0) to the time point T3, the target path TR1 being generated by the generation unit 112. The subject vehicle 101 is a self-driving vehicle to which the vehicle control apparatus 100 according to the present embodiment is applied. Broken lines VL1 and VR1 in the drawing represent a pair of left and right virtual division lines which are a result of recognizing the division lines BL and BR based on the captured image of the imaging unit 1. Broken lines VL2 and VR2 represent a pair of left and right virtual division lines which are a result of recognizing the division lines BL and BR based on the captured image of the imaging unit 2.

In the example illustrated in FIG. 4, erroneous recognition of the division lines occurs in the imaging unit 1 (the recognition unit 1*a*), and the virtual division lines VL1 and VR1 deviate to the right side (downward in the drawing)

from the actual division lines BL and BR at positions away from the subject vehicle 101 in a traveling direction, similarly to the virtual division lines VL and VR in FIG. 1. At this time, among the virtual division lines VL1 and VL2 positioned on the left side of the subject vehicle 101, the virtual division line VL1 having a short distance from the subject vehicle 101 is selected by the generation unit 112. Among the virtual division lines VR1 and VR2 positioned on the right side of the subject vehicle 101, the virtual division line VR2 having a short distance from the subject vehicle 101 is selected by the generation unit 112. As a result, the generation unit 112 generates the target path that fits within the current lane, such as the target path TR1 illustrated in FIG. 4. As described above, as each of the left and right virtual division lines having a short distance from the subject vehicle 101 is selected, even in a case where erroneous recognition of the division lines occurs in any of the imaging units 1 and 2 (the recognition units 1*a* and 2*a*), it is possible to mitigate road departure of the subject vehicle 101 and to further lengthen a time until the road departure. As a result, it is possible to secure more time to transfer driving operation to the driver.

The actuator control unit 113 controls the actuators AC in such a way that the subject vehicle 101 travels along the target path generated by the generation unit 112.

Figure 5:
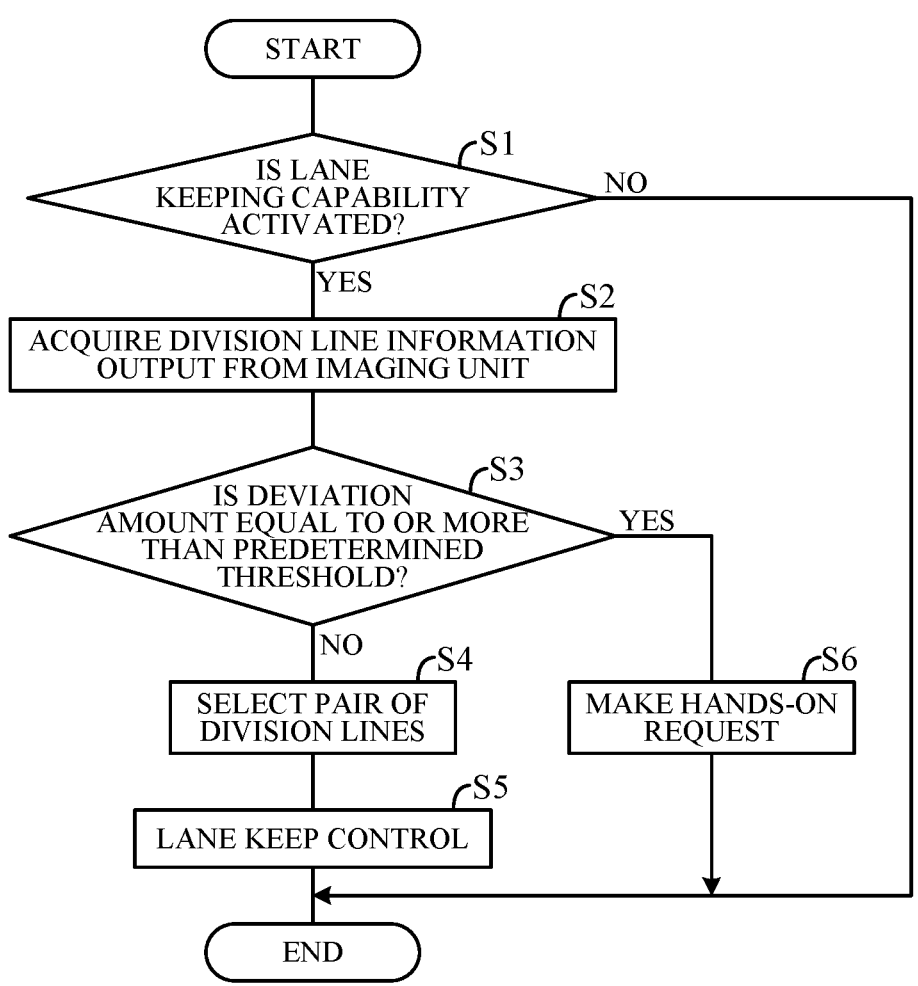
FIG. 5 is a flowchart illustrating an example of processing executed by the CPU of the controller in FIG. 2.

FIG. 5 is a flowchart illustrating an example of processing executed by the CPU of the controller 10 in FIG. 2 according to a pre-stored program. The processing in the flowchart is, for example, executed at a predetermined cycle while the subject vehicle 101 is traveling in the self-drive mode.

First, in S1, it is determined whether or not the lane keeping function is activated. If NO in step S1, the processing ends. If YES in step S1, the division line information output from the recognition units 1*a* and 2*a* of the imaging units 1 and 2 is acquired in step S2. Further, the position information of the pair of left and right division lines (virtual division lines VL1 and VR1) that define the current lane and are recognized by the recognition unit 1*a* and the position information of the pair of left and right division lines (virtual division lines VL2 and VR2) that define the current lane and are recognized by the recognition unit 2*a* are acquired based on the division line information. The position information of the virtual division line may be information indicating the relative position of the virtual division line with respect to the subject vehicle, or may be information indicating the position of the virtual division line on the map. In step S3, a deviation amount DV1 between the virtual division lines VR1 and VR2 is calculated based on the position information of the virtual division lines VR1 and VR2. Similarly, a deviation amount DV2 between the virtual division lines VL1 and VL2 is calculated based on the position information of the virtual division lines VL1 and VL2. Then, it is determined whether or not any of the calculated deviation amounts DV1 and DV2 is equal to or more than a predetermined threshold. If NO in step S3, each of the left and right virtual division lines having short distances from the subject vehicle 101 are selected from the virtual division lines VL1, VR1, VL2, and VR2 in step S4. In step S5, the target path passing through the center between the pair of left and right virtual division lines selected in step S4 is generated, and the actuators AC are controlled in such a way that the subject vehicle travels along the generated target path. On the other hand, if YES in step S3, the hands-on request is made in step S6.

In the present embodiment, the following operations and effects are achievable.

(1) The vehicle control apparatus 100 controls the actuators AC in such a way that the subject vehicle 101 travels along the target path. The vehicle control apparatus 100 includes: the imaging units 1 and 2 that each detect the exterior environment situation in the predetermined region around the subject vehicle 101; the recognition unit 1*a* that recognizes a pair of left and right first division lines (virtual division lines VL1 and VR1) defining the current lane in which the subject vehicle 101 travels based on a detection value (captured image data) of the imaging unit 1; the recognition unit 2*a* that recognizes a pair of left and right second division lines (virtual division lines VL2 and VR2) defining the current lane based on a detection value (captured image data) of the imaging unit 2; and the generation unit 112 that selects each of left and right virtual division lines having short distances from the subject vehicle from the pair of left and right virtual division lines VL1 and VR1 and the pair of left and right virtual division lines VL2 and VR2 recognized by the recognition units 1*a* and 2*a*, respectively, and generates the target path based on the selected virtual division lines. As a result, it is possible to satisfactorily perform the travel control of the vehicle and mitigate road departure during self-driving. As a result, traffic safety can be improved.

(2) The generation unit 112 generates the target path in such a way as to pass through the center between the selected left and right virtual division lines. As a result, even in a case where erroneous recognition of the division lines occurs in any of the imaging units, it is possible to further lengthen a time until road departure, and it is possible to secure more time to transfer driving operation to the driver.

The above-described embodiment can be modified into various forms. Some modifications will be described below. In the above-described embodiment, the imaging unit 1 and the imaging unit 2 detect the exterior environment situation in the predetermined region around the subject vehicle 101, as a first exterior environment detection unit and a second exterior environment detection unit, respectively. However, the first exterior environment detection unit and the second exterior environment detection unit may be other than the imaging unit (camera), or may be a radar or LiDAR. Furthermore, in the above-described embodiment, the vehicle control apparatus 100 including a first imaging unit (the imaging unit 1) as the first exterior environment detection unit and a second imaging unit (the imaging unit 2) as the second exterior environment detection unit has been described as an example, but the vehicle control apparatus may include three or more exterior environment detection units. In the above-described embodiment, the recognition units 1*a* and 2*a* recognize the exterior environment situation in the predetermined region around the subject vehicle 101 based on the captured images obtained by the imaging units 1 and 2, but the configuration of the recognition units is not limited thereto. The recognition unit may recognize the exterior environment situation in the predetermined region around the subject vehicle 101 based on information obtained through road-to-vehicle and vehicle-to-vehicle communications via the communication unit 3.

Furthermore, in the above-described embodiment, the recognition units 1*a* and 2*a* recognize the division lines included in the imaging ranges based on the captured image data obtained by the imaging units 1 and 2. However, the recognition unit may change a recognition range (a region having a length in the traveling direction from the subject vehicle 101) of division line based on the vehicle speed of the subject vehicle 101 detected by the vehicle speed sensor 5. Specifically, the recognition unit may change the recognition range of division line in such a way that the recognition range of division line is enlarged in the traveling direction as the vehicle speed of the subject vehicle 101 increases. As a result, the hands-on request (S6) can be made before time to line crossing (TTLC) (=distance from subject vehicle 101 to center line/lateral acceleration of subject vehicle 101) becomes less than a predetermined value, and it is possible to further mitigate road departure of the subject vehicle 101.

In the above-described embodiment, the determination unit 111 determines that there is a possibility that the road departure of the subject vehicle 101 occurs when any one of the deviation amount DV1 between the virtual division lines VR1 and VR2 in the vehicle width direction and the deviation amount DV2 between the virtual division lines VL1 and VL2 in the vehicle width direction is equal to or greater than a predetermined threshold. However, the determination unit may determine that there is a possibility that the road departure of the subject vehicle 101 occurs when an average value of the deviation amounts DV1 and DV2 is equal to or greater than a predetermined threshold, or may determine that there is a possibility that the road departure of the subject vehicle 101 occurs when both of the deviation amounts DV1 and DV2 are equal to or greater than a predetermined threshold.

Furthermore, in the above-described embodiment, the recognition units 1*a* and 2*a* recognize the division lines based on the captured images of the imaging units 1 and 2 by using different algorithms. However, the configuration of each recognition unit is not limited thereto. The respective recognition units may recognize the division lines by using the same algorithm.

Furthermore, in the above-described embodiment, the vehicle control apparatus 100 in which the processing units of the imaging units 1 and 2 function as the recognition units 1*a* and 2*a* has been described as an example, but the configuration of the vehicle control apparatus is not limited thereto. The vehicle control apparatus may include the controller 10 (the processing unit 11) including the recognition units 1*a* and 2*a* as a functional configuration. In this case, the recognition unit 1*a* acquires the captured image data output from the imaging unit 1 to the controller 10. Similarly, the recognition unit 2*a* acquires the captured image data output from the imaging unit 2 to the controller 10. Then, the recognition units 1*a* and 2*a* recognize the exterior environment situation in the predetermined region around the subject vehicle 101 based on the acquired captured image data. Furthermore, in the above-described embodiment, an example in which the vehicle control apparatus is applied to a self-driving vehicle having the lane keeping function as one of the self-driving capabilities has been described, but the present invention can be similarly applied to a manual driving vehicle having the lane keeping function or the like as one of driving assistance functions.

The above embodiment can be combined as desired with one or more of the above modifications. The modifications can also be combined with one another.

According to the present invention, it is possible to satisfactorily perform travel control of a vehicle.

Above, while the present invention has been described with reference to the preferred embodiments thereof, it will be understood, by those skilled in the art, that various changes and modifications may be made thereto without departing from the scope of the appended claims.

What is claimed is:

1. A traveling control apparatus comprising:
   an actuator for traveling;

a microprocessor and a memory coupled to the microprocessor; and first and second cameras mounted on a subject vehicle and installed so as to respectively capture images of a same region in front of the subject vehicle in a traveling direction, wherein the first and second cameras each capture a forward space of the subject vehicle including a left division line and a right division line defining a current lane on which the subject vehicle is traveling, and wherein the microprocessor is configured to perform:

applying an image-recognition process using a first algorithm to a captured image of the first camera to acquire a first recognition result including the left and right division lines, and applying an image-recognition process using a second algorithm different from the first algorithm to a captured image of the second camera to acquire a second recognition result including the left and right division lines;

calculating a first deviation amount, the first deviation amount being a difference, in a vehicle width direction, between a position of the left division line included in the first recognition result and a position of the left division line included in the second recognition result;

calculating a second deviation amount, the second deviation amount being a difference, in the vehicle width direction, between a position of the right division line included in the first recognition result and a position of the right division line included in the second recognition result;

determining that there is a possibility that the subject vehicle departs from the current lane when either the first deviation amount or the second deviation amount is equal to or greater than a predetermined threshold;

when it is determined that the possibility exists, outputting a command to an output device configured to request an occupant to perform a driving operation; and when it is determined that the possibility does not exist:

selecting, from among the left division lines respectively included in the first and second recognition results, a left division line located further to the right in the vehicle width direction;

selecting, from among the right division lines respectively included in the first and second recognition results, a right division line located further to the left in the vehicle width direction;

generating a target path so as to pass through a center between the selected left and right division lines; and controlling the actuator so that the subject vehicle travels along the target path.

2. The traveling control apparatus according to claim 1, wherein the first camera and the second camera are different in manufacturer, type, or performance.

* * * * *